Sept. 20, 1966 W. M. MILLER 3,273,821
ICE FISHING REEL
Filed Jan. 27, 1964 3 Sheets-Sheet 2

INVENTOR.
WILLIAM M. MILLER
BY Hood, Gust & Irish
ATTORNEYS

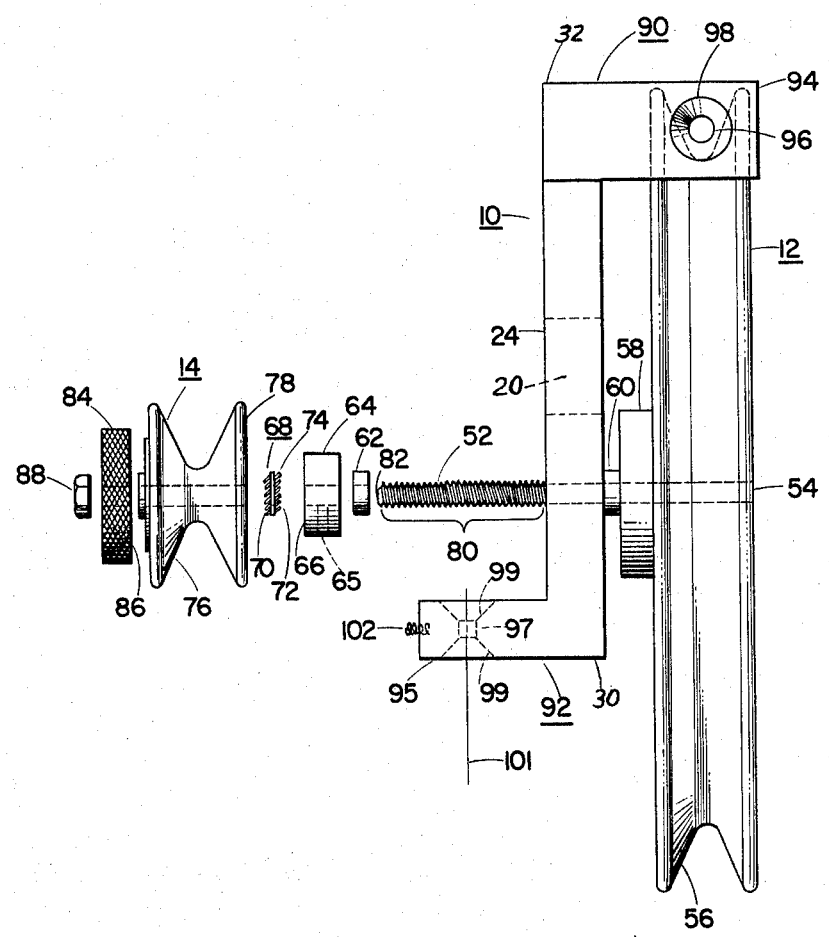

United States Patent Office 3,273,821
Patented Sept. 20, 1966

3,273,821
ICE FISHING REEL
William M. Miller, Spencerville, Ind.
Filed Jan. 27, 1964, Ser. No. 340,346
5 Claims. (Cl. 242—106)

This invention relates generally to an improved fishing line reel, and more specifically to an improved ice fishing reel or winch.

Whenever fishing line is desired to be raised or stored for the baiting of a hook, or for some similar purpose, ice fishermen have conventionally used rather primitive means for handling the fishing line. Therefore, conventionally it is not uncommon for fishing line to become entangled or for the fishing line to be laid upon the ice thereupon to become frozen and secured to the ice surface. It is therefore desirable to provide a means by which fishing line can be stored and easily raised and lowered so as to eliminate these conventional fish line handling problems. Still further, it is desirable to provide that the fish line storing and handling means be actuated by a movement that is much shorter in length than the movement of fishing line from the fully raised to the fully lowered position, so that the ice fisherman's control of said line is simple as possible. It is therefore the primary object of this invention to provide an improved ice fishing winch having a mechanical disadvantage thereby providing for lowering or raising fishing line a distance many times greater than the distance of movement actuating said winch.

Another object of this invention is to provide an improved ice fishing reel which can be secured over a fishing hole in the ice for storing fishing line and controllably lowering and raising the same.

Still another object of this invention is to provide an improved ice fishing winch having a clutch whereby the fishing line may be selectively lowered to the desired depth by means of a simple control.

A further object of this invention is to provide an improved ice fishing reel that can be supported in a depending manner from the ceiling of an ice fishing shanty.

Still further, an object of this invention is to provide an improved ice fishing winch having both a clutch whereby a fishing line may be selectively lowered to the desired depth and a means for lowering and raising said fishing line which travels only a fraction of the movement of the fishing line.

Further objects and advantages of the invention will become apparent by reference to the following description and the accompanying drawings, and the features of novelty which characterize the invention will be pointed out with particularity in the claims annexed to and forming a part of this specification.

In accordance with the broader aspects of this invention, a fishing reel is provided comprising an elongated frame having a bearing extending transversely through the frame at a position intermediate the ends of the frame and means is provided for mounting the frame in a substantially horizontal position, for example over a hole in the ice. Rotatable first means is provided, such as a pulley, for storing and dispensing fish line thereon and is secured to a shaft at one end thereof, the shaft being rotatably supported in the bearing and extending on both sides of the frame. Rotatable second means is provided, such as a smaller pulley, for storing and dispensing actuating cord thereon and is coaxially supported on the shaft and rotatable independent of the shaft and the first means. A clutch means is provided movable from a first position to a second position through a series of intermediate positions, the clutch in the first position having means for securing the second means to the shaft thereby preventing the second means from rotating independently of the first means, the clutch in the intermediate positions controllably permitting the second means to rotate on the shaft independently of the first means, and the clutch in the second position allowing the second means freely to rotate independently of the first means. This arrangement provides a clutch means which selectively can be disengaged to pay out any desired length of fishing line from the first means and can be engaged so as to permit the actuation of the first means by the second means to raise or lower fishing line. The second means is chosen to be of a size relative to the first means so as to provide for an actuating movement that is much shorter than the distance that the fishing line is moved by the first means.

In the drawings:

FIG. 3 is a view of the improved ice fishing reel of this invention taken along the section line 3—3 of FIG. 1, and showing an exploded view of the clutch mechanism.

Figure 1:
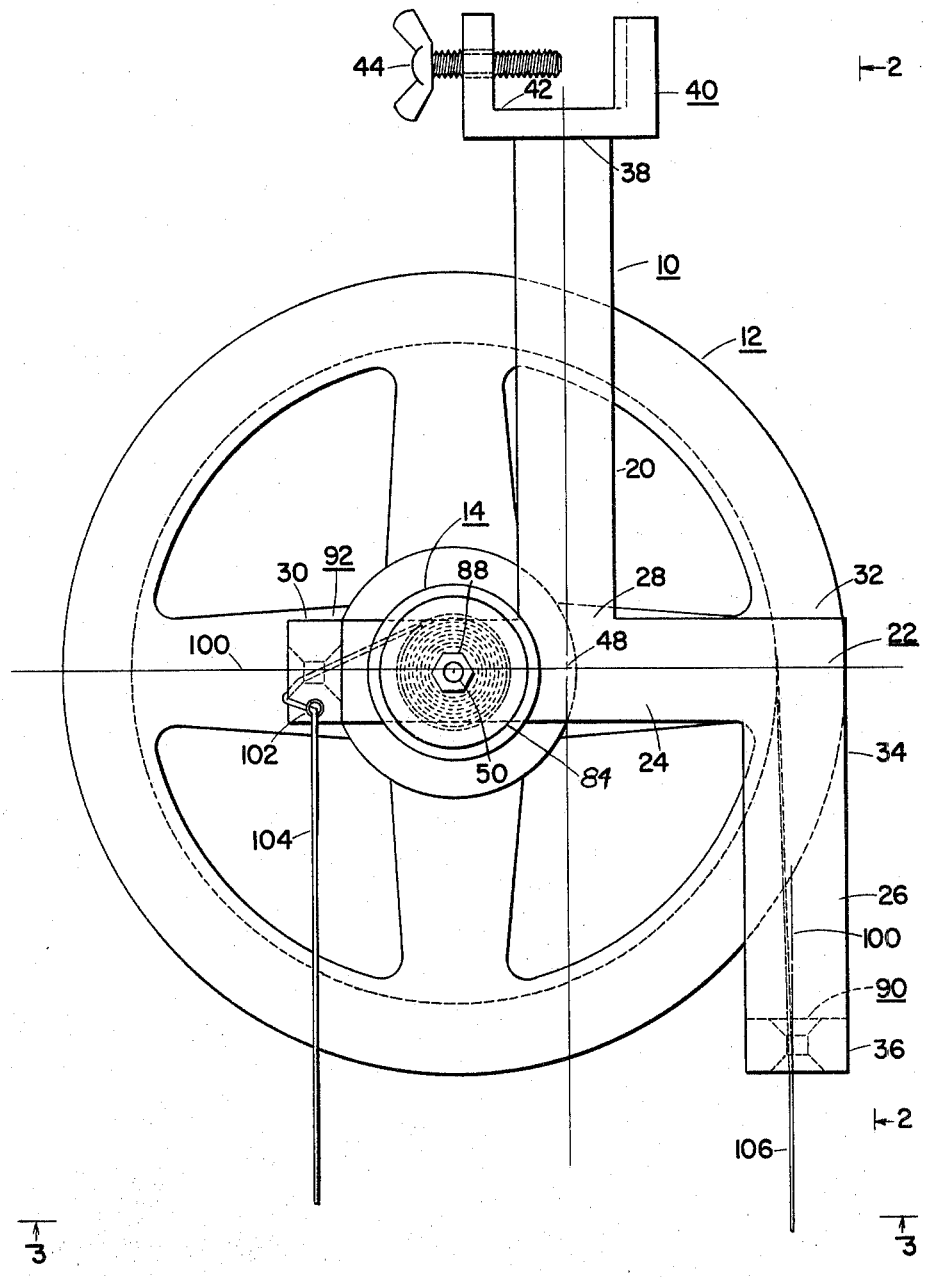
FIG. 1 is a side view of the improved ice fishing reel of this invention.
Figure 2:
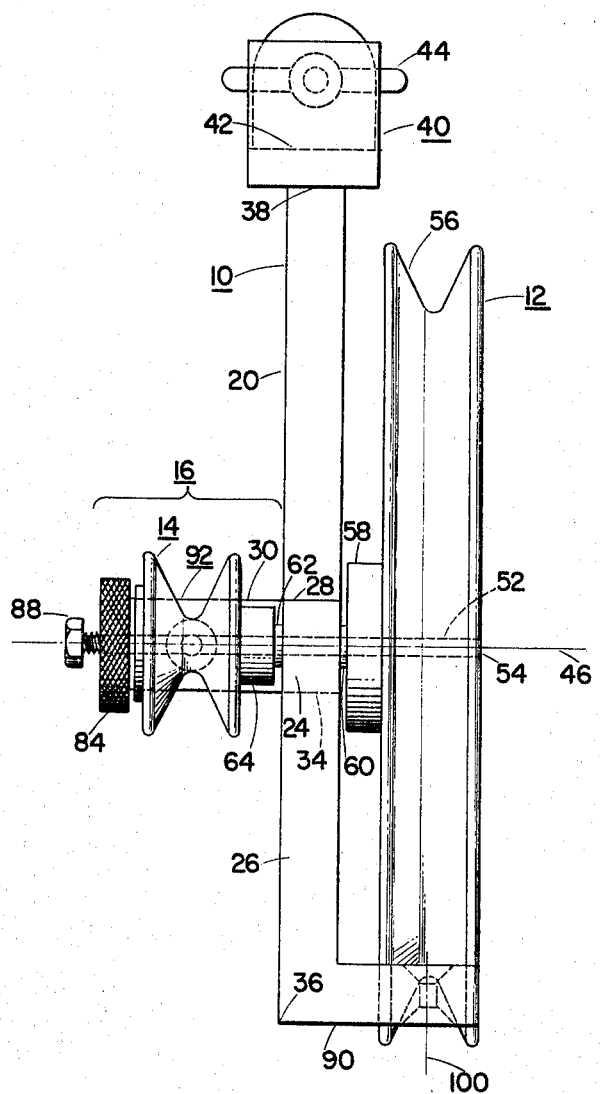
FIG. 2 is a view of the improved ice fishing reel of this invention taken along the section line 2—2 of FIG. 1.

Referring now to the drawings, there is shown an improved ice fishing reel comprising a frame 10, a large pulley 12, a small pulley 14, and a clutch mechanism 16 which permits pulley 14 selectively to rotate independently of pulley 12.

Frame 10 comprises an elongated neck portion 20 and a substantially "L-shaped" support portion 22 having a longer part 24 and a shorter part 26. Neck portion 20 is joined at end 28 to longer part 24 of support portion 22 at a medial position intermediate the ends 30 and 32. Shorter part 26 is joined at end 34 to end 32 of longer part 24 thereby providing interior ends 32 and 34 of longer part 24 and shorter part 26, respectively, and distal ends 30, 36 of longer part 24 and shorter part 26, respectively. In the illustrated embodiment, neck portion 20 extends perpendicularly from longer part 24 and shorter part 26 extends perpendicularly from end 32 of longer part 24. At end 38 of neck portion 20, opposite end 28, there is joined to neck portion 20 an upwardly facing clamp 40 comprising a "U-shaped" base 42 and a wing nut 44 which is threadedly inserted through one of the upright portions of base 42 so as to be forcibly movable into spaced-apart relationship with the other upright portion of base 42. Neck portion 20 depends perpendicularly from the base portion 42, thereby providing a means for supporting frame 10 in a manner that neck portion 20 and shorter part 26 are substantially vertical and longer part 24 is substantially horizontal.

An opening 50 is provided extending through longer part 24 and having an axis 46 which is substantially transverse to longer part 24 and intermediate a point 48 midway between ends 30 and 32 of longer part 24. In the illustrated embodiment of this invention, axis 46 is located at a medial position between end 30 and point 48.

A shaft 52 is coaxially inserted in opening 50 thereby being rotatably supported by longer part 24 of support portion 22. Shaft 52 extends outwardly from both sides of support portion 22. A relatively large pulley 12 is secured to end 54 of shaft 52 so as to prevent pulley 12 from rotating independently of shaft 52. Pulley 12 has a groove 56 having measurements such that a substantial length of fishing line may be stored thereon. Pulley 12 is positioned adjacent frame 10 being spaced therefrom only by hub portion 58 and a washer 60. In the illustrated embodiment, pulley 12 has an outside radius substantially identical to the distance between axis 46 and end 32 of the longer part 24.

Supported on shaft 52 on the other side of frame 10 is a washer 62 and an annular spacer 64. Annular spacer 64 is secured to shaft 52, as by a set screw 65, thereby preventing any rotation of spacer 64 independent of shaft 52 and thereby permitting rotation of spacer 64 only if pulley 12 and shaft 52 also rotate. Spacer 64 is spaced from frame 10 solely by washer 62. Spacer 64 has a flat end surface 66 facing outwardly away from frame 10. Coaxially supported on shaft 52 adjacent end surface 66 of spacer 64 is a conventional lock washer 68 having two flat end surfaces 70 and 72. A plurality of radially aligned teeth 74 protrude from each end surface 70 and 72.

Coaxially supported on shaft 52 adjacent lock washer 68 is pulley 14 which has a groove 76 of a size so as to provide for storing a length of cord substantially shorter than the length of fishing line stored on pulley 12. Pulley 14 has at least one flat end surface 78 which is positioned to face end surface 66 of spacer 64. Shaft 52 has a threaded portion 80 which substantially extends from end 82 of shaft 52 to a position adjacent frame 10. Threadedly supported on shaft 52 is a thumb screw 84 comprising a knurled annular ring having a threaded interior. Thumb screw 84 has a flat end surface 86 facing pulley 14. An abutment 88 is positioned on end 82 of threaded portion 80 thereby preventing thumb screw 84 from being removed from shaft 52. Abutment 88, in a preferred embodiment, may be a conventional nut cross-threaded onto portion 80 thereby securing the nut to shaft 52.

A pair of line guides 90 and 92 are provided and are positioned adjacent pulleys 12 and 14, respectively. Line guides 90 and 92, respectively, comprise base members 94, 95 which have holes 96, 97 having axes 100, 101 communicating with each exterior surface of members 94, 95 by means of conical recesses 98, 99. Line guide 90 is secured substantially perpendicularly to shorter portion 26 at end 36 and extends substantially horizontally toward pulley 12 with axis 100 of hole 96 extending substantially vertically, and with hole 96 in registry with groove 56 of pulley 12. Line guide 92 on the other hand, is substantially perpendicularly secured to longer part 24 at end 30 and extends substantially horizontally and outwardly toward pulley 14. In this position, axis 101 of hole 97 of the line guide 92 is substantially horizontal intersecting axis 46 of opening 50 and hole 97 is in registry with groove 76 of pulley 14.

A small coil spring 102 is secured to the exterior surface of line guide 92 for the purpose of securing the cord 104 which is stored on pulley 14, by means of inserting the cord 104 through spring 102 as is shown in FIG. 1. The cord 104 may be held stationary within line guide 92 so that pulley 14 may not rotate in a clockwise direction.

In a specific embodiment, frame 10 is integrally formed of any suitable material such as metal, plastic, or the like. Neck portion 20 measures three inches in length while longer part 24 measures four and one-quarter inches in length and shorter part 26 measures two and one-half inches in length. Line guides 90 and 92 have bases 94, 95 which are one inch in length and holes 96, 97 measuring five-sixteenths inch in diameter. Pulley 12 is six inches in diameter and pulley 14 is one and one-half inches in diameter.

In operation, clamp 40 is secured to any suitable overhead support, such as the overhead portion of an ice fishing shanty, by means of wing-nut 44 such that neck portion 20 depends in a substantially vertical position and that hole 96 of line guide 90 is in registry with the hole in the ice through which fishing line 106 is to be lowered. Secured in this position, the fishing reel or winch of this invention provides a means for storing a substantial length of fishing line 106 in groove 56 of pulley 12; the storage capacity of pulley 12 is such that all of the fishing line desired may be stored thereon. In order selectively to lower fishing line 106 through the hole in the ice to the desired fishing depth, thumb screw 84 is rotated counterclockwise permitting pulley 12 to turn independently of pulley 14. In this position of thumb screws 84, the weight of fishing line 106 and the weights that may be used on the fishing line 106 will rotate pulley 12 in a clockwise direction of FIG. 1, thereby lowering fishing line 106 through the opening in the ice. As the desired fishing depth is approached, thumb screw 84 may be controllably rotated in a clockwise direction thereby selectively impairing the independent rotation of pulley 12 to pulley 14. Pulley 14 being prevented from rotating in a clockwise manner by the securance of cord 104 in spring 102 will stop pulley 12 from rotating when thumb screw 84 is rotated in a clockwise direction far enough frictionally to secure pulley 14 to spacer 64. It can thereby be seen that by controlled clockwise rotation of thumb screw 84 the clockwise rotation of pulley 12 can be completely independent of the rotation of pulley 14, can be frictionally impaired thereby controlling the speed of clockwise rotation of pulley 12, or can be stopped. The frictional impairment of the clockwise rotation of pulley 12 is substantially achieved by the lock washer 68 which spaces apart the end surface 78 of pulley 14 and the end surface 66 of spacer 64. When knurled thumb screw 84 is clockwise rotated, end surfaces 78 and 66 are urged into intimate contact with end surfaces 70 and 72, respectively, of lock washer 68 which has a plurality of radial teeth 74. It can be easily seen, that by forcibly urging end surfaces 78, 66 together with lock washer 68 therebetween, teeth 74 will engage the end surfaces 78 and 66 and thereby provide the frictional forces therebetween which may secure pulley 14 to spacer 64 if the forces urging pulley 14 and spacer 64 together are increased to an amount sufficient to prevent slippage therebetween. Thereby pulley 14, by means of the aforementioned structure, is also secured to pulley 12, preventing pulley 14 from rotating independently of pulley 12.

Whenever fish line 106 is desirably to be stored or raised for the baiting of a hook, or some similar purpose, the knurled thumb screw 84 is maintained in the position in which it secures pulley 14 to spacer 64 and cord 104 is removed from spring 102 thereby permitting movement of cord 104. By drawing on cord 104 in a downwardly direction, pulley 14 is rotated in a counterclockwise direction along with the pulley 12. While cord 104 unwinds from its storage position on pulley 14, fish line 106 is stored upon pulley 12 and raised in elevation. Because of the mechanical disadvantage derived from choosing pulley 14 to be significantly smaller than pulley 12, the force needed to apply to cord 104 to raise fish line 106 will be many times the weight of the fish line 106 and the hooks and weights attached thereto. In a specific embodiment, the mechanical disadvantage may be in the range of four to one to six to one. This mechanical disadvantage, however, allows fish line 106 to be moved by means of an actuating movement of cord 104 that is many times smaller than the movement of fish line 106. In the embodiment illustrated, the movement of cord 104 will cause fish line 106 to move approximately six times as far. Therefore, in normal operation the relatively small movement of line 104 will raise fish line 106 to a level at which bait and additional weights etc., may be added to fish line 106. After fish line 106 has been once lowered to a desirable fishing depth and then raised as aforementioned, fish line 106 may be re-lowered to fishing depth either by actuation of the clutch mechanism 16 as heretofore described or alternatively by removing cord 104 from spring 102 and then by controllably releasing the force necessary to maintain cord 104 stationary thereby permitting cord 104 to wind on pulley 14 and for fishing line 106 to unwind from pulley 12.

Line guides 90 and 92 provide direction for fish line 106 and cord 104, respectively, and also insure that the winding and unwinding of fish line 106 and cord 104 will occur on pulleys 12 and 14, respectively, in orderly fashion without entanglement.

It should be noted, that the specific embodiment of the invention illustrated in the drawings positions the guide line 92 and the opening 50 in frame 10 through which the shaft 52 is mounted in such a position that the forces exerted by fishing line 106 and cord 104 do not cause frame 10 to twist or to rotate about clamp 40. Therefore clamp 40, when positioned securely, will not easily become loose nor will the object to which clamp 40 is fastened be subjected to any sheer-type stress, and the resultant force created by the fishing reel in operation will be substantially a force directed downwardly in the direction of neck portion 20.

Therefore, it can be seen that the invention provides an improved fishing reel or winch that neatly stores fishing line in an out-of-the-way position and greatly increases the time available for tending other fishing lines or for relaxation. The storage of fishing line 106 on a means such as pulley 12, has the further advantage over conventional means of handling fishing line when ice fishing in that entanglement of fishing line is practically eliminated. Further, the ease of lowering and raising the fishing line is greatly enhanced. If a suitable mark is placed upon the fishing line so that when the mark is in alignment with a fixed object either on the ice, on the reel or on the fishing shanty, the line will be lowered to a desired fishing depth, the fishing line may be lowered to that depth by means of two simple movements of thumb screw 84: first, a counterclockwise rotation of screw 84 until pulley 12 begins to rotate clockwise thereby lowering fishing line; second, a clockwise rotation as the fishing line approaches the desired depth thereby to slow down the clockwise rotation of pulley 12 and the descent of fishing line and finally to stop the rotation of pulley 12 and the descent of fishing line. Fishing line then can be raised to a position at which hooks can be easily baited by moving cord 104 in a downwardly direction; the movement being many times shorter in length than the distance that the fishing line is raised. Finally, fishing line can be re-lowered to a desired fishing depth by controllably releasing the force necessary to maintain cord 104 stationary thereby permitting cord 104 to move in an upwardly direction until the fishing line is positioned as desired.

While I have illustrated and described specific embodiments of the invention, further modifications and improvements will occur to those skilled in the art and I desire therefore in the appended claims to cover all modifications which do not depart from the spirit and scope of my invention.

What is claimed is:

1. An ice fishing winch comprising: an integrally formed frame having an elongated neck portion with opposite ends and a generally "L-shaped" support portion comprising a longer part and a shorter part each having an interior end and a distal end, respectively, said longer and shorter parts being joined perpendicularly at said interior ends, said neck portion being joined perpendicularly at one of said neck portion ends to said longer part at a medial position, intermediate said interior and distal ends of said longer part, said longer part having a transverse opening therethrough communicating with both sides of said longer part and being midway between said medial position and said distal end of said longer part; a clamp comprising a "U-shaped" base and a movable member that can be forcibly urged into clamping relationship with said base, said clamp being operatively positioned with said base opening upwardly, the other of said ends of said neck portion being secured to said base with said neck portion depending from said base, a first pulley having a means for storing fishing line thereon; a shaft having an axis and first and second ends; said first pulley being coaxially secured to said shaft at said first end thereby preventing independent rotation of said first pulley and said shaft, said shaft being rotatably supported in said opening with said first pulley being adjacent said longer part, said shaft extending through said longer part and having a threaded portion adjacent said second end extending from said second end toward said longer part, said longer part being between said first pulley and said shaft portion, said first pulley being rotatable in a clockwise direction to dispense fishing line and a counterclockwise direction to store fishing line; an annular spacer having a central opening and at least one flat spacer end surface, said spacer being coaxially secured to said shaft thereby preventing independent rotation of said first pulley and said shaft, said spacer being spaced from said first pulley by said longer part, said flat spacer end surface facing away from said longer part; a lock washer comprising an annular ring having two flat washer end surfaces, said washer end surfaces having a plurality of radially aligned teeth thereon, said lock washer being coaxially supported on said shaft adjacent said spacer end surface; a second pulley having means for storing actuating cord and at least one flat pulley end surface, said second pulley being coaxially supported on said shaft adjacent said lock washer said second pulley end surface facing said lock washer, said lock washer spacing apart said pulley end surface from said spacer end surface, said second pulley being rotatable in a counterclockwise direction to dispense cord and a clockwise direction to store cord, said second pulley having a diameter substantially smaller than said first pulley whereby withdrawal of a predetermined length of said actuating cord from said second pulley winds a substantially greater length of said fishing line upon said first pulley; a thumb screw comprising an annular ring having a threaded interior, said thumb screw being threadedly mounted on said shaft portion, said thumb screw being adjacent said second pulley and spaced from said lock washer by said second pulley, said thumb screw being rotatable from a first position in which said second pulley is secured to said spacer by means of forcibly engaging said teeth of said lock washer to said second pulley and spacer end surfaces, thereby preventing said second pulley and said first pulley from rotating independent of the other, through a series of intermediate positions, to a second position in which said thumb screw is spaced from said second pulley thereby permitting said second pulley to rotate independently of said first pulley, said series of intermediate positions having at least one of said pulley and spacer end surfaces in sliding engagement with said lock washer, said sliding engagement being selectively impaired by varying the frictional forces between said lock washer and said pulley and spacer end surfaces to a different degree at each of said intermediate positions of said thumb screw thereby forming a clutch by which said first pulley may be permitted selectively to rotate freely and independently of said second pulley, permitted to rotate with a selected frictional impairment and independently of said second pulley, and prevented from rotating independently of said second pulley; first and second line guides each having an opening therein, said first guide being perpendicularly secured to said distal end of said longer part in registry with said fishing line storing means, said second guide being perpendicularly secured to said distal end of said shorter part in registry with said cord storing means; and means for maintaining cord in a stationary position in said first guide member.

2. The fishing winch of claim 1 wherein said first pulley has a diameter from four to six times the diameter of said second pulley.

3. An ice fishing winch comprising: mounting means having an upwardly facing clamping portion and a substantially vertically depending elongated portion; an integrally formed elongated frame having opposite ends, said frame depending from said elongated portion in a substantially horizontal position, said frame being connected to said elongated depending portion at a medial position between said opposite ends, said frame having a tubular bearing therein, said bearing being substantially transverse to said frame and intermediate one of said ends and said medial position; a first pulley having a means for storing fishing line thereon; a shaft having an axis and first and second ends, said first pulley being coaxially secured to said shaft at said first end thereby preventing independent rotation of said first pulley and said shaft, said shaft being rotatably supported in said bearing, said shaft having a threaded shaft portion adjacent said second end extending from said second end toward said frame, said frame spacing apart said first pulley and said shaft portion, said first pulley being rotatable in a first direction to dispense fishing line and in a second direction to store fishing line, an annular spacer having a central opening and at least one flat spacer end surface, said spacer being coaxially secured to said shaft thereby preventing independent rotation of said first pulley and said spacer, said spacer being spaced from said first pulley by said frame, said flat spacer end surface facing away from said frame; a lock washer coaxially supported on said shaft having two oppositely facing gripping surfaces; a second pulley having means for storing cord and at least one flat pulley end surface, said second pulley being coaxially supported on said shaft adjacent said lock washer with said pulley end surface facing said lock washer, said lock washer spacing apart said pulley end surface from said spacer end surface, said second pulley being rotatable in a counterclockwise direction to dispense cord and a clockwise direction to store cord, said second pulley having a diameter substantially smaller than said first pulley whereby withdrawal of a predetermined length of said actuating cord from said second pulley winds a substantially greater length of said fishing line upon said first pulley; a thumb screw comprising an annular ring having a threaded interior, said thumb screw being threadedly mounted on said shaft portion, said thumb screw being adjacent said second pulley and spaced from said lock washer by said second pulley, said thumb screw being rotatable from a first position in which said second pulley is secured to said spacer by means of forcibly engaging said gripping surfaces to said pulley and spacer end surfaces, thereby preventing said second pulley and said first pulley from rotating independent of the other, through a series of intermediate positions to a second position in which said thumb screw is spaced from said second pulley, thereby permitting said second pulley to rotate independently of said first pulley, said series of intermediate positions having at least one of said pulley and spacer end surfaces in sliding engagement with said lock washer, said sliding engagement being selectively impaired by varying the frictional forces between said lock washer and said pulley and spacer end surfaces to a different degree at each of said intermediate positions of said thumb screw thereby forming a clutch by which said first pulley may be permitted selectively to rotate freely and independently of said second pulley, permitted to rotate with a selected frictional impairment independently of said second pulley and prevented from rotating independently of said second pulley; said first and second line guides each having an opening therein, said first guide being perpendicularly secured to said one of said ends of said frame in registry with said fishing line storing means, said second guide depending from said other of said ends of said frame in registry with said cord storing means.

4. A fishing reel comprising: an elongated frame having opposite ends; means for mounting said frame in a substantially horizontal position; said frame having a tubular bearing therein; said bearing being substantially transverse to said frame and intermediate said ends; a first pulley having a means for storing fishing line thereon; a shaft having an axis and first and second ends, said first pulley being coaxially secured to said shaft at said first end thereby preventing independent rotation of said first pulley and said shaft, said shaft being rotatably supported in said bearing, said shaft having a threaded shaft portion adjacent said second end extending from said second end toward said frame, said frame spacing apart said first pulley and said shaft portion, said first pulley being rotatable in a first direction to dispense fishing line and in a second direction to store fishing line, a ring having at least one end surface, said ring being coaxially secured to said shaft thereby preventing independent rotation of said shaft and said ring, said ring being spaced from said first pulley by said frame, said end surface facing away from said frame; a second pulley having means for storing cord and at least one pulley end surface, said pulley being coaxially supported on said shaft adjacent said ring, said ring and pulley end surfaces facing each other, said second pulley being rotatable in said second direction to dispense cord and in said first direction to store cord, said second direction being opposite said first direction, said second pulley having a diameter substantially smaller than said first pulley whereby withdrawal of a predetermined length of said actuating cord from said second pulley winds a substantially greater length of said fishing line upon said first pulley; a thumb screw threadedly mounted on said shaft portion adjacent said second pulley, said thumb screw being rotatable into a first position securing said second pulley to said ring by means of frictional forces between said thumb screw and said second pulley and frictional forces between said second pulley and said ring thereby preventing said second pulley from rotating independently of said first pulley, said thumb screw being rotatable into a series of second positions permitting rotation of said second pulley independently of said first pulley, said rotation being selectively impaired by varying the frictional forces between said thumb screw and said second pulley and between said second pulley and said ring to a different degree at each of said second positions thereby forming a clutch by which said first pulley may be selectively permitted to rotate freely and independently of said second pulley, permitted to rotate with a selected frictional impairment independently of said second pulley and prevented from rotating independently of said second pulley.

5. A fishing reel comprising: a frame; means for mounting said frame on a support; said frame having a tubular bearing therein, said bearing being substantially transverse to said frame; a first pulley having a means for storing fishing line thereon; a shaft having an axis and first and second ends, said first pulley being coaxially secured to said shaft at said first end thereby preventing independent rotation of said first pulley and said shaft, said shaft being rotatably supported in said bearing, said shaft having a threaded shaft portion adjacent said second end extending from said second end toward said frame, said frame spacing apart said first pulley and said shaft portion, said first pulley being rotatable in a first direction to dispense fishing line and in a second direction to store fishing line, a ring having at least one end surface, said ring being coaxially secured to said shaft thereby preventing independent rotation of said shaft and said ring, said ring being spaced from said first pulley by said frame, said end surface facing away from said frame; a second pulley having means for storing cord and at least one pulley end surface, said pulley being coaxially supported on said shaft adjacent said ring, said ring and pulley end surfaces facing each other, said second pulley being rotatable in said second direction to dispense cord and in said first direction to store cord, said second direction being opposite said first direction, said second pulley having a diameter substantially smaller than said first pulley whereby withdrawal of a predetermined length of said actuating cord from said second pulley winds a substantially greater length of said fishing line upon said first pulley; a thumb screw threadedly mounted on said shaft portion adjacent said second pulley, said thumb screw being rotatable into a first position securing said second pulley to said ring by means of frictional forces between said thumb screw and said second pulley and frictional forces between said second pulley and said ring thereby preventing said second pulley from rotating independently of said first pulley, said thumb screw being rotatable into a series of second positions permitting rotation of said second pulley independently of said first pulley, said rotation being selectively impaired by varying the frictional forces between said thumb screw and said second pulley and between said second pulley and said ring to a different degree at each of said second positions thereby forming a clutch by which said first pulley may be selectively permitted to rotate freely and independently of said second pulley, permitted to rotate with a selected frictional impairment independently of said second pulley and prevented from rotating independently of said second pulley.

References Cited by the Examiner

UNITED STATES PATENTS

| | | | |
|---|---|---|---|
| 396,956 | 1/1889 | Prouty | 242—84.44 |
| 1,676,696 | 7/1928 | Kanawyer et al. | 242—100 |
| 2,136,438 | 11/1938 | Horsrud | 242—84.45 |
| 2,219,500 | 10/1940 | West | 242—77 |

FOREIGN PATENTS 92,524　1/1962　Denmark.

FRANK J. COHEN, *Primary Examiner.*

MERVIN STEIN, STANLEY N. GILREATH,
*Examiners.*

B. S. TAYLOR, *Assistant Examiner.*